United States Patent Office 2,757,118
Patented July 31, 1956

2,757,118

METHOD FOR CONTROLLING MOLLUSKS WITH DIETHYL THIOPHOSPHORYL BIS(DIMETHYL-AMIDO) PHOSPHATE

William T. Dye, Jr., Dayton, Ohio, assignor to Monsanto Chemical Company, St. Louis, Mo., a corporation of Delaware No Drawing. Application November 20, 1951,
Serial No. 257,420

1 Claim. (Cl. 167—22)

This invention provides a new, insecticidal product and also provides a process for combating insect and mollusk pests.

I have discovered that diethyl thiophosphoryl bis(dimethylamido)phosphate is particularly effective, both as a molluscacide and as an insecticide, and may be employed either as a systemic or a contact insecticide.

Diethyl thiophosphoryl bis(dimethylamido)phosphate may be obtained by the interaction of sodium diethyl thiophosphate and bis(dimethylamido)phosphoryl chloride. The reaction which takes place involves a condensation of the reactants and may be illustrated by the following equation:

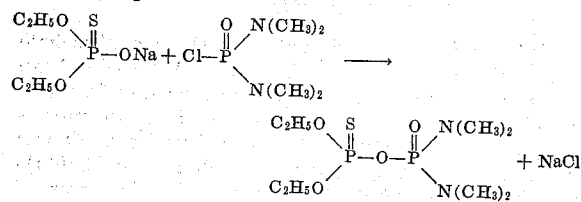

The reaction above illustrated may be carried out either in the absence or in the presence of a solvent. The use of a solvent is generally advised, since by its use a somewhat larger yield of the product is obtained. Almost any inert hydrocarbon solvent such as benzene, toluene, xylene, petroleum hydrocarbons, monochlorobenzene or mixtures thereof may be employed. The sodium diethyl thiophosphate employed in the above reaction may be prepared according to the process referred to in Chemical Abstracts, 41, 1599 (1947).

The temperature of reaction may range from room temperature to a temperature of 200° C. When it is desired to use temperatures above the boiling point of the solvent where the same is employed, the reaction may be carried out under pressure.

The product produced by the above process followed by vacuum distillation may be employed for combating biological pests, such as for insecticidal and molluscacidal purposes in the pure form as thus obtained. In many cases, however, it may not be necessary to purify the product by distillation or by other means. Moreover, since the sodium chloride formed as a by-product is generally inert with respect to vegetation, upon which the biological toxicant may be employed, the presence of such sodium chloride is not objectionable and therefore this material may be permitted to remain in the reaction product and the entire crude reaction product employed as herein-described for combating insects or mullusks, or in the compounding of insecticidal or molluscacidal compositions. Either the purified or the crude diethyl thiophosphoryl bis(dimethylamido)phosphate may be mixed with carriers such as solvents, emulsions or powders and applied to vegetation or soil infested with insects or mollusks in the usual manner.

The present compound has been found to be soluble in petroleum or aromatic hydrocarbon oils of the type generally used as insecticide carriers and also to possess a pronounced insecticidal activity. For the purpose of employing the present compound as an insecticide, it may be combined with a carrier such as a dust, an aliphatic or aromatic hydrocarbon oil solvent or in aqueous emulsion and in this form may be applied to insects as a contact insecticide. The present compound or formulation thereof may also be applied directly to plants as a systemic insecticide, in which case the active component is absorbed by the plant so that insects which then feed on the plant itself are also killed by the action of the insecticide.

The compound of the present invention may be formulated into insecticidal compositions in any desired form, for example, as dusts, as aqueous emulsions or oil solutions. For application to insect-infested vegetation, the present compound is combined with a carrier such as an aliphatic hydrocarbon oil boiling between 370° F. and 510° F. in an amount such as to produce a solution containing from 0.5% to 10% or more by weight. If desired, the solution so formed may be further diluted to produce dilute solutions wherein the concentration of the active diethyl thiophosphoryl bis(dimethylamido)phosphate ranges from 25 to 500 parts per million.

The discovery of effective molluscacides is of extreme importance to mankind due to the fact that elimination of certain snails, which are a class of animal life, Gastropoda, within the phylum Mollusca, seems to be a sound approach to the prevention of schistosomiasis, which is reputedly the world's number three health problem. Schistosomiasis is caused by a trematode of the genus Schistosoma, a kind of flat, leaf-shaped worm called a fluke, which must depend upon certain snails for a part of its life cycle and another part of its life cycle must be spent within the body of a warm-blooded animal, particularly human beings, where it attacks the internal organs.

Thus these snails are a necessary intermediate host or vector for the fluke which causes schistosomiasis. The life cycle of the fluke can therefore be broken and the spread of the schistosomiasis stopped by the elimination of the snails which act as the necessary intermediate host or vector for the fluke. The elimination of the snails which make the life cycle of this fluke possible is of particular importance due to the fact that there are no known therapeutic curatives or prophylactics for use against schistosomiasis, nor are there any established sanitary control methods against the causative fluke.

There are both aquatic and amphibious snails which are vectors for the fluke causing schistosomiasis. Human beings who must bathe, drink, wade or do laundry in the waters which are the habitats of such aquatic or amphibious snails are thereby exposed to the flukes which cause schistosomiasis. On the other hand, human beings who encounter the land areas or vegetation which are within the habitats of the amphibious snail vector are also likely to contract schistosomiasis.

In combating the aquatic type of snail, it is necessary to apply the molluscacide to the waters or land areas adjacent thereto which form the habitats for such snails and therefore to be practical as a molluscacide, the toxic agent must exhibit molluscacidal activity at relatively high dilutions.

In combating the amphibious type of snail which also serves to propagate this disease, diethyl thiophosphoryl bis(dimethylamido)phosphate may also be formulated into a dust which can be dispersed or scattered on vegetation or the ground along the banks of streams, rivers and irrigation canals or the edges of other bodies of water so that the amphibious snail will come into contact with this molluscacidal agent when it leaves the water and begins to travel across the land.

Inert diluent powders for the formulation of such dusts may be fuller's earth, diatomaceous earth, bentonite, talc, pyrophyllite or various natural clays such as Homer's clay, china clay or Cherokee clay; botanical carriers such as soybean flour, wood flour, or walnut shell flour may also be used. Best results are obtained with such dust formulations where the particle size of the dust formulation has been reduced to 5 microns or below, and also where the inert carrier is an adsorbent powder. Effective liquid molluscacidal formulations may also be prepared comprising diethyl thiophosphoryl bis(dimethylamido)phosphate as the essential active ingredient using various solvents such as xylene and any one of a large number of well known emulsifying agents. The actual concentration of the essential component for any specific application will be determined upon whether the chemical is to be applied directly to the water which forms the habitat for the snails or to land areas which are crossed by amphibious snails, either as the chemical alone or in a formulation.

While the diethyl thiophosphoryl bis(dimethylamido)phosphate may be most advantageously used to combat the amphibious type of snail which are vectors for the fluke which causes shistosomiasis, this chemical is also effective for combating other species of the phylum Mollusca.

The diethyl thiophosphoryl bis(dimethylamido)phosphate may be formulated either in the form of simple dusts, wettable powders or emulsions.

Suitable compositions for this purpose may have the following composition, the percentages being by weight:

| | Percent |
|---|---|
| Dusts— | |
| Active ingredient | 5 |
| Inert powder | 95 |
| Wettable powders— | |
| Active ingredient | 15 to 50 |
| Inert powder | 48 to 83 |
| Wetting agent | 2 |
| Emulsion— | |
| Active ingredient | 15 to 50 |
| Solvent (e. g. xylene) | 30 to 80 |
| Wetting agent | 5 to 10 |

The following examples specifically illustrate the embodiments of the invention with respect to the process for preparing diethyl thiophosphoryl bis(dimethylamido)phosphate and processes for the treatment of soil or vegetation to combat attacks of insects or mollusks.

*Example 1*

The preparation of diethyl thiophosphoryl bis(dimethylamido)phosphate was carried out by refluxing 0.3 mole (41.5 g.) of diethyl phosphite together with 0.3 atom (6.9 g.) of metallic sodium in 300 cc. of benzene. This mixture was refluxed overnight, after which the unreacted sodium was removed. About 8.5 g. of sulfur was then added while the above solution was boiling, sulfur addition being stopped when a permanent orange color was evident. The mixture was then cooled, after which 0.3 mole (51 g.) of bis(dimethylamido)phosphoryl chloride dissolved in 500 cc. of benzene was added. The above components were then refluxed at the boiling point of the solution for a period of about 70 hours. The reaction mixture was cooled, washed three times with water to remove sodium chloride, after which the crude product was distilled under vacuum to remove solvent and unreacted bis(dimethylamido)phosphoryl chloride. The diethyl thiophosphoryl bis(dimethylamido)phosphate remaining thereafter was a bright yellow liquid which could not be distilled under normal conditions. The analysis obtained on the above product was as follows:

| | Theory | Found |
|---|---|---|
| N | 9.21 | 8.73 |
| S | 10.53 | 11.09 |

*Example 2*

In order to show the use of diethyl thiophosphoryl bis(dimethylamido)phosphate as a contact insecticide, this compound was utilized at a concentration of 1:1,000 in water. The solution was applied to bean plants and was found to have a high kill for the 2-spotted mite on the bean plants.

In the above test, solutions of the indicated concentration of the present compound were applied to the insect by means of an atomizer-type spray. However, water solutions or hydrocarbon-water emulsions may also be employed for the present purpose. When preparing water-oil emulsions, it is generally desirable to incorporate a wetting or emulsifying agent in the emulsion or solution. A suitable wetting or emulsifying agent may be sodium dodecylbenzenesulfonate to aid in forming the emulsion or solution and also to wet the insects or vegetation upon which the spray is applied.

The present compound is soluble in mixed aromatic-aliphatic hydrocarbon oils. Concentrated solutions containing high proportions of the diethyl thiophosphoryl bis(dimethylamido)phosphate, namely, from 10% to 50% or more by weight, may be prepared. Such concentrated solutions are conveniently employed in the preparation of more dilute solutions or water-oil emulsions of the compound which are suitable for insect spraying purposes.

*Example 3*

Diethyl thiophosphoryl bis(dimethylamido)phosphate was employed as a systemic insecticide by placing bean plants in the solutions. Mites were then transferred to the plants after four days, and the plants themselves changed to a water substratum five days later. It was found that diethyl thiophosphoryl bis(dimethylamido)phosphate, when used at a concentration in water of 1:10,000, gave a 100% kill of the mites without harm to the bean plant, while at a concentration of 1:100,000 there was obtained a 90% kill of the mites.

*Example 4*

Diethyl thiophosphoryl bis(dimethylamido)phosphate was also tested as a molluscacide by determining the effective dilution factor which is generally expressed as the maximum aqueous dilution which will produce a 50% kill of snails. When diethyl thiophosphoryl bis(dimethylamido)phosphate was employed in this manner it was found that a concentration of 1:6,750 gave a 50% kill.

The present compound embodying a sulfur atom in the molar structure has the advantage over non-sulfur compounds in that it is somewhat more resistant to hydrolysis, so that water emulsions may be prepared with the assurance that the useful life of such emulsions will be considerably longer than that obtained from emulsions containing compounds without the thio group.

What I claim is:

The method for controlling mollusks comprising contacting mollusks with diethyl thiophosphoryl bis(dimethylamido)phosphate.

References Cited in the file of this patent

UNITED STATES PATENTS

| 2,063,629 | Salzberg | Dec. 8, 1936 |
| 2,494,283 | Cassaday | Jan. 10, 1950 |
| 2,520,393 | Fletcher | Aug. 29, 1950 |
| 2,567,154 | Kosolapoff | Sept. 4, 1951 |
| 2,577,796 | Morris | Dec. 11, 1951 |

OTHER REFERENCES

Schrader: The Development of New Insecticides, pages 25, 26 and 32, B. I. O. S. Report PB 87923-R, April 13, 1948. (Report available at Office of Technical Services, Commerce Department, Washington, D. C.)